Sept. 23, 1958  R. W. SEXTON  2,853,153
MILITARY VEHICLE AIR FILTER
Filed Dec. 31, 1956
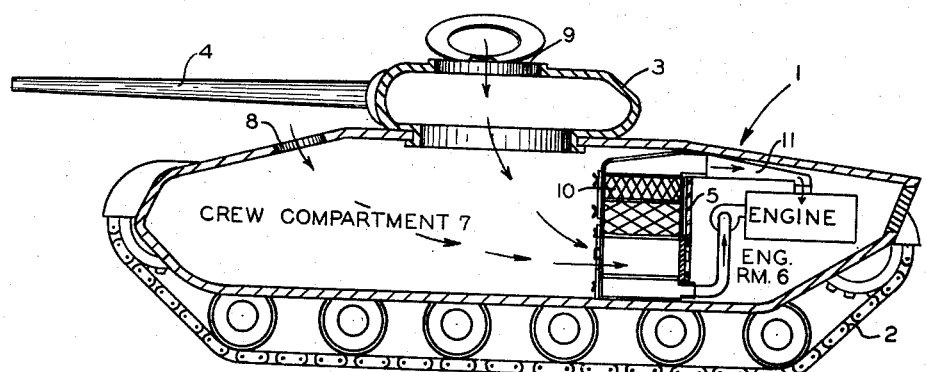
FIG. 1
FIG. 2
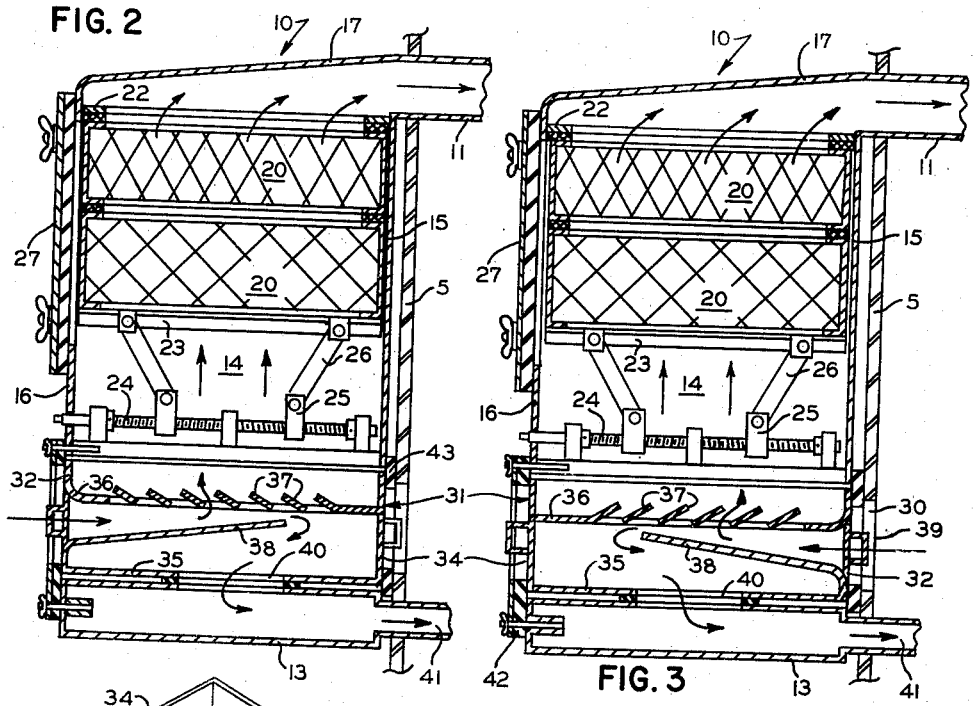
FIG. 3
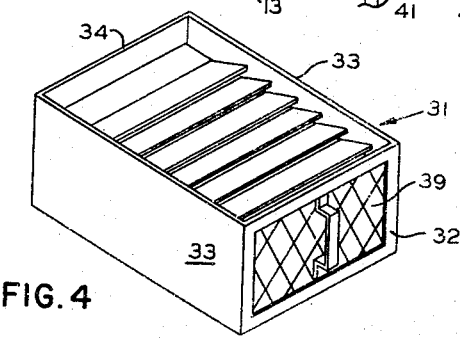
FIG. 4
*INVENTOR.*
ROBERT W. SEXTON
BY
ATTORNEY

United States Patent Office 2,853,153
Patented Sept. 23, 1958

2,853,153

MILITARY VEHICLE AIR FILTER

Robert W. Sexton, Louisville, Ky., assignor to American Air Filter Company, Inc., Louisville, Ky., a corporation of Delaware Application December 31, 1956, Serial No. 631,679

4 Claims. (Cl. 183—34)

This invention relates to an engine intake air filter construction for a military tank vehicle.

It is conventional to design the engine intake air filter of military tanks so they can be serviced and changed from the crew compartment of the tank. This has been done by mounting the air filter unit on the crew side of a wall separating the engine compartment and crew compartment.

It is also conventional to arrange the air intake of the air filter unit to alternately draw air from the engine compartment or the crew compartment. Various reasons exist for this alternate intake arrangement. One reason is that during warm weather, air is drawn from the crew compartment to cool the crew, but during cold weather, air is drawn from the engine compartment to keep the crew compartment from becoming uncomfortable. However, even in cold weather, it sometimes is necessary to quickly switch the air filter intake to the crew compartment, for example, during the fording of a body of water where the water level in the engine compartment may rise above the air filter intake.

It has previously been proposed to provide military tank air filters with an inertia type precleaner for removing the heavier dirt particles from the air entering the filter. However, the problem arose as to how to mount the precleaner so that air could be alternately drawn from the crew compartment or the engine compartment.

An object of this invention is to provide a military tank air filter incorporating a precleaner which can be readily and quickly switched between alternate positions of drawing air from the crew compartment or from the engine compartment.

Another object of this invention is to provide an air filter construction having a precleaner drawer, with a drawer front serving as an air inlet for the filter, which can be readily removed and inserted backwards to switch the air filter inlet from drawing air from the crew compartment to drawing air from the engine compartment, and vice versa.

These objects are obtained in the following air filter construction mounted in a military tank having a wall separating the crew compartment from the engine compartment, comprising: an air filter housing attached to said wall on its crew compartment side; a conduit interconnecting the air outlet of said housing and a tank engine; the air inlet portion of said air filter housing including a drawer receiving pocket having open mouths at opposite ends, one mouth opening into the crew compartment and the other mouth opening into the engine compartment, said pocket having an opening intermediate its ends to discharge air into the remainder of said housing; and a precleaner drawer having an inlet opening along its front adapted to be inserted into said pocket with its front arranged in either the crew compartment mouth or the engine compartment mouth.

The invention is illustrated in the following drawings wherein:

Fig. 1 is a diagrammatic longitudinal section of a military tank vehicle illustrating the mounting of the present air filter invention;

Fig. 2 is an elevational section of an air filter constructed in accordance with the present invention and arranged to draw air from the crew compartment;

Fig. 3 is the air filter of Fig. 2 arranged to draw air from the engine compartment; and Fig. 4 is a perspective view of a precleaner drawer forming the present invention.

A conventional military tank 1 is illustrated in Fig. 1 having a tread track 2 a revolving turret 3 supporting a gun 4, and an interior separated by a wall 5 into an engine room 6 and a crew compartment 7. Access into and ventilation of the crew compartment is obtained through a forward hatch 8 and a turret hatch 9.

An air filter 10, constructed in accordance with the present invention, is mounted on the crew side of the wall 5 and is connected by a conduit 11 to the carburetor intake of a tank engine mounted in the engine room 6.

The construction of the air filter unit 10 is illustrated in Figs. 2 and 3 and includes a housing, also designated by the reference number 10, surrounding a vertical air flow path. The housing 10 includes a hollow bottom wall 13, a pair of opposite sidewalls 14, a rear wall 15, a front wall 16, and a top wall 17.

The conduit 11 extends through the wall 5 and is connected to the outlet opening in the rear wall 15 adjacent the top wall 17.

A plurality of vertically stacked filter cells 20 are mounted in the housing 10 to extend across the vertical air flow path. The marginal edges of the cells 20 are compressed between an inwardly extending peripheral flange 22 mounted in the upper end of the housing 10 and an open faced presser frame 23 vertically moved against the lower edges of the cells by a suitable adjusting mechanism. The adjusting mechanism shown includes a horizontal screw 24 journalled on suitable brackets in the housing 10 and having oppositely threaded end portions. Each end portion carries a nut 25 pivotally connected to one end of a toggle 26 having its opposite end pivotally connected to the frame 23. Rotation of the screw 24 in one direction moves the nuts 25 apart to raise the presser frame 23, while rotation in the opposite direction moves the nuts together to lower the presser frame.

The filter cells 20 are inserted into and removed from the housing 10 through an access opening arranged in the front wall 16 and normally covered by a sealing plate 27 affixed by suitable means, such as the wing nuts illustrated, to the front wall 16.

The lower end of the housing 10, below the cell receiving space, is provided with a horizontal drawer receiving space or pocket extending across the housing immediately above the hollow bottom wall 13 between the front wall 16 and the rear wall 15. This drawer receiving space has an aligned opening or mouth in the front wall 16 and an aligned opening or mouth in the rear wall 15. The opening in the rear wall 15 is also aligned with a smaller opening 30 in the wall 5. The top of the drawer receiving space opens upwardly into the remainder of the housing while its bottom is defined by the housing bottom wall 13.

A precleaner drawer 31 is adapted to be removably mounted in the drawer receiving space and includes a front 32, a pair of sides 33, a back 34 and a bottom 35.

The drawer 31 includes a horizontal partition 36 having a series of transversely extending louver slats 37 sloped upwardly and toward the front of the drawer 31 providing a series of longitudinally spaced air flow slots. An upwardly and rearwardly inclined plate 38 extends from adjacent the lower edge of the front 32 and terminates near the back 34 and slightly below the partition 36. Thus, a small slot remains between the terminal edge of the plate 38 and the lower face of the partition 36. The front 32 has a central inlet opening 39, covered by a suitable screen, allowing air to enter the interior of the drawer between the slotted partition 36 and the inclined plate 38.

The bottom 35 of the drawer 31 has a central opening 40 aligned with an opening in the upper surface of the hollow bottom wall 13 of the housing 10. The hollow wall 13 is connected by a dirty air outlet pipe 41, extending through the wall 5, to the suction side of the air cooling blowers of the tank engine, or any other suitable blower means for applying a suction to the pipe 41.

The dimentions of the precleaner drawer 31 are selected so that approximately 10% of the air drawn through the inlet 39 is drawn out by the suction in the pipe 41, while 90% is drawn upwardly through the filter cells 20 by the suction of the carburetor intake on conduit 11.

Air enters the inlet 39 at high speed and has to reverse its movement and turn upwardly to get between the slats 37 before continuing to the cells 20. This movement is easier for air, due to its light weight, than for dust particles in the air. Thus, 90% of the air passes upwardly through the slats 37, filter cells 20 and into conduit 11, while the majority of the dust particles, with 10% of the air, continues toward the back of the drawer 31 to pass between the partition 36 and the terminal edge of the inclined plate 38, through the opening 40, into the hollow bottom wall 13 and the pipe 41. This type of precleaner is conventionally known as an inertia type air cleaner.

A suitable sealing gasket frame 42 is removably mounted on the housing front wall 16 about the housing front wall mouth to abut the drawer end, to latch the drawer in the housing, and to seal the cracks between the drawer end and the housing. A gasket 43 is also arranged about the mouth in the housing rear wall 15 to abut the other end of the drawer and to seal the cracks between the drawer end and the housing. Handles are mounted on each end of the drawer for facilitating its removal from the pocket through the crew compartment mouth in the housing front wall 16.

When the precleaner drawer 31 is inserted into the drawer receiving space or pocket of the housing 10 with its front 32, containing the inlet 39, filling the drawer opening or mouth in the housing front wall 16, as illustrated in Fig. 2, all of the air drawn by the filter unit 10 will be drawn through the inlet 39 from the crew compartment 7. In this position, the drawer back 34 will close the opening or mouth in the housing rear wall 15 and the opening 30 in the wall 5. This position of the precleaner drawer is used during hot weather to ventilate the crew compartment.

During cold weather, it is preferable to have the filter unit drawing its air from the engine room 6 as illustrated in Fig. 3. This is done by removing the precleaner drawer 31 through the housing front wall mouth, reversing it, and re-inserting it front first in the housing 10. The front 32, containing the inlet 39, will then fill the housing rear wall mouth, aligned with opening 30, and the drawer back 34 will close the housing front wall mouth. In this position, the filter unit will draw air from the engine room 6 through the opening 30 in the wall 5, and the inlet 39 in the precleaner drawer front 32.

Having described my invention, I claim:

1. An air filter apparatus for military tanks and the like, comprising: a housing having a clean air outlet zone, an air cleaning zone and an air inlet zone, the latter including a drawer-receiving pocket having a first air inlet in the form of an open mouth at one end to receive air from one source, a second air inlet in the form of an open mouth at its other end to receive air from a second source and an air outlet opening intermediate its mouths to discharge air into said air cleaning zone; a drawer having an open inlet end and a closed end arranged to be positioned reversibly within said pocket to receive air through its open end and discharge it into said air cleaning zone, said drawer being operative, when positioned one way, to selectively receive air from said one source through said first air inlet and to block air flow from said second source through said second air inlet and, when positioned in the reverse way, to selectively receive air from said second source through said second air inlet and to block air flow from said first source through said first air inlet and inertia type air cleaning means included in said drawer for separating dust particles from a major portion of the air entering said drawer inlet end.

2. The apparatus of claim 1 wherein: said pocket is below said air cleaning zone in said housing.

3. The apparatus of claim 2 wherein: said pocket opens upwardly into said air cleaning zone.

4. The apparatus of claim 1 wherein said housing includes dirty air outlet means cooperating with a dirty air outlet opening in said drawer when said drawer is disposed in said pocket to discharge said separated dust particles from said housing.

References Cited in the file of this patent

UNITED STATES PATENTS

| | | |
|---|---|---|
| 1,623,636 | Reynolds | Apr. 5, 1927 |
| 1,633,561 | Drew | June 21, 1927 |
| 2,226,630 | McCord | Dec. 31, 1940 |
| 2,557,717 | Anthony | June 19, 1951 |